United States Patent
Shimizu et al.

(10) Patent No.: US 12,391,143 B2
(45) Date of Patent: Aug. 19, 2025

(54) VEHICLE

(71) Applicant: TOYOTA JIDOSHA KABUSHIKI KAISHA, Toyota (JP)

(72) Inventors: Tatsuya Shimizu, Okazaki (JP); Katsuya Shimazu, Toyota (JP); Ayaka Kagami, Inazawa (JP); Mutsumi Kawashima, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 121 days.

(21) Appl. No.: 18/512,917

(22) Filed: Nov. 17, 2023

(65) Prior Publication Data
US 2024/0181922 A1  Jun. 6, 2024

(30) Foreign Application Priority Data
Dec. 5, 2022  (JP) ................. 2022-194394

(51) Int. Cl.
| | |
|---|---|
| *B60L 53/80* | (2019.01) |
| *B60L 53/30* | (2019.01) |
| *B60L 58/18* | (2019.01) |
| *B60L 58/26* | (2019.01) |
| *H01M 10/42* | (2006.01) |
| *H01M 10/48* | (2006.01) |
| *H01M 10/613* | (2014.01) |
| *H01M 10/625* | (2014.01) |
| *H01M 10/6568* | (2014.01) |
| *H01M 50/249* | (2021.01) |
| *H01M 50/30* | (2021.01) |

(52) U.S. Cl.
CPC ........... *B60L 53/80* (2019.02); *B60L 53/30* (2019.02); *B60L 58/18* (2019.02); *B60L 58/26* (2019.02); *H01M 10/4285* (2013.01); *H01M 10/48* (2013.01); *H01M 10/613* (2015.04); *H01M 10/625* (2015.04); *H01M 10/6568* (2015.04); *H01M 50/249* (2021.01); *H01M 50/30* (2021.01); *B60L 2250/16* (2013.01); *H01M 2220/20* (2013.01)

(58) Field of Classification Search
CPC .......... B60L 53/80; B60L 58/18; B60L 58/26; B60L 53/30; H01M 10/613; H01M 10/625; H01M 10/6568; H01M 50/249
See application file for complete search history.

(56) References Cited

FOREIGN PATENT DOCUMENTS

JP  2020-058150 A  4/2020

*Primary Examiner* — Ramsey Refai
(74) *Attorney, Agent, or Firm* — Dinsmore & Shohl LLP (57) ABSTRACT

A vehicle includes a power storage device, a gas supply unit, a vehicle side refrigerant connector, a vehicle side electric connector, and a gas supply pipe. The power storage device includes an electric connector, a refrigerant connector, and a ventilation path. A first connection portion where the vehicle side refrigerant connector and the refrigerant connector are connected to each other includes a first closed space and a second connection portion where the vehicle side electric connector and the electric connector are connected to each other includes a second closed space. The gas supply pipe is provided to supply gas to at least one of the first closed space and the second closed space. The ventilation path is provided to communicate with the gas supply pipe through at least one closed space and the ventilation path is provided with a flow detector.

8 Claims, 5 Drawing Sheets

VEHICLE

This nonprovisional application is based on Japanese Patent Application No. 2022-194394 filed on Dec. 5, 2022 with the Japan Patent Office, the entire contents of which are hereby incorporated by reference.

BACKGROUND

Field

The present disclosure relates to a vehicle.

Description of the Background Art

Conventionally, Japanese Patent Application Laid-Open No. 2020-58150 discloses a vehicle-mounted battery determination system in which it is possible to determine whether a battery mounted on a vehicle is a correct type of mounting battery.

Specifically, a first control device having a first storage section for storing battery information is provided on the battery pack side. On the vehicle side, a second control device which is communicably provided with the first control device and which stores information of a battery to be mounted on the vehicle is provided.

When the battery pack is mounted on the vehicle, the first control device and the second control device determine whether the battery is a battery for mounting by comparing the information of the battery stored in the first storage unit with the information of the battery for mounting stored in the second storage unit.

SUMMARY

In order to stabilize the vehicle's navigation, a battery pack (power storage device) mounted on the vehicle is replaced with another battery pack. As another battery pack, not only a battery pack in a new state but also a battery pack in which a battery pack once used is recharged may be used.

In a battery pack mounted on a vehicle, a cooling device in which a refrigerant such as a coolant flows may be used in order to cool a battery disposed in a housing case. In this case, in order to connect a cooling circuit provided on the vehicle side to the cooling device, a vehicle side refrigerant connector is provided on the vehicle body side. A refrigerant connector connected to the vehicle side refrigerant connector is provided on the battery device side.

Further, in order to connect the electric system on the vehicle side and the electric system on the battery side, a vehicle side electric connector is provided on the vehicle body side. An electric connector connected to the vehicle side electric connector is provided on the battery device side.

When such a connector on the vehicle side and a connector on the battery device side are connected to each other, a connecting portion between the connector on the vehicle side and the connector on the battery device side is airtightly or liquid-tightly sealed using a sealing member such as a packing.

When the battery pack is replaced, a battery pack which is used once and charged again may be newly attached. In the case where the battery pack in which the sealing member has degraded due to vibration caused by traveling of the vehicle or long-term use is charged and attached to the vehicle, there is a concern that the connection between the connector on the vehicle side and the connector on the battery device side is not good.

It is an object of the present disclosure to provide a vehicle capable of detecting a connection state between a connector on a vehicle side and a connector on a battery device side.

A vehicle based on the present disclosure is a vehicle to which a power storage device is attached replaceably. The vehicle includes the power storage device, an auxiliary battery, a gas supply unit to which power is supplied from the auxiliary battery, a refrigerant circuit through which refrigerant flows, the refrigerant circuit including a vehicle side refrigerant connector provided as being connectable to the power storage device, a vehicle side electric connector provided as being connectable to the power storage device, and a gas supply pipe to which gas can flow from the gas supply unit, the gas supply pipe being connected to the gas supply unit.

The power storage device includes an electric connector provided as being connectable to the vehicle side electric connector, a refrigerant connector provided as being connectable to the vehicle side refrigerant connector, and a ventilation path provided to communicate to the gas supply pipe. The vehicle side refrigerant connector and the refrigerant connector are connected to form a first connection portion that contains a first closed space. The vehicle side electric connector and the electric connector are connected to form a second connection portion that contains a second closed space. The gas supply pipe is provided to supply the gas into at least one hermetically closed space of the first closed space and the second closed space. The ventilation path is provided to communicate with the gas supply pipe through the at least one hermetically closed space. The ventilation path is provided with a flow detector that detects a flow state of the gas that flows through the ventilation path.

According to the above configuration, the flow detector can detect the flow state of the gas that flows through the ventilation path that communicates with at least one of the first closed space and the second closed space formed by connection of the vehicle side connector and the power storage device side connector to each other. As a result, the connection state between the vehicle side connector and the power storage device side connector can be detected.

The vehicle based on the present disclosure may further include a controller that controls an operation of the gas supply unit with power from the auxiliary battery and a connection detector that detects connection of the vehicle side electric connector and the electric connector to each other. The power storage device may include a power storage module and a refrigerant flow path through which the refrigerant for cooling of the power storage module flows. The gas supply pipe may include a first supply pipe through which the gas can be supplied to the first closed space. The ventilation path may include a first path formed by the refrigerant flow path. In this case, when the connection detector detects connection of the electric connector and the vehicle side electric connector to each other, the controller may drive the gas supply unit to introduce the gas into the first closed space. The flow detector may include a first detector that detects a flow state of the gas that flows through the first path.

According to the above configuration, when the power storage device mounted on the vehicle side is replaced with another power storage device, the connection state between the refrigerant connector on the power storage device side and the vehicle side refrigerant connector can be detected at the timing when the connection between the electric connector of another power storage device and the vehicle side electric connector is detected.

In the vehicle based on the present disclosure, the first path may include a downstream refrigerant connection portion in which a first connector and a second connector are connected to each other, on a downstream side of the first connection portion in a flow direction of the refrigerant. The downstream refrigerant connection portion may contain a third closed space. The flow detector may include a first downstream detector provided in a portion of the first path located downstream of the third closed space, the first downstream detector detecting the flow state of the gas that flows through the first path.

According to the above configuration, the connection state of the downstream refrigerant connection portion in which the first connector and the second connector are connected to each other on the downstream side of the first connection portion in the first path formed by the refrigerant flow path provided in the power storage device can also be detected.

The vehicle based on the present disclosure may further include a controller that controls an operation of the gas supply unit with power from the auxiliary battery and a connection detector that detects connection of the vehicle side electric connector and the electric connector to each other. The power storage device may include a power storage module and an electric circuit that connects the power storage module and the electric connector to each other. The gas supply pipe may include a second supply pipe through which the gas can be supplied to the second closed space. The ventilation path may include a second path provided along the electric circuit. When the connection detector detects connection of the electric connector and the vehicle side electric connector to each other, the controller may drive the gas supply unit to introduce the gas into the second closed space. The flow detector may include a second detector that detects a flow state of the gas that flows through the second path.

According to the above configuration, when the power storage device mounted on the vehicle side is replaced with another power storage device, the connection state between the electric connector on the power storage device side and the vehicle side electric connector can be detected at the timing when the connection between the electric connector of another power storage device and the vehicle side electric connector is detected.

In the vehicle based on the present disclosure, the second path may include a downstream connector connection portion where a third connector and a fourth connector are connected to each other, on a side of the power storage module relative to the second connection portion. The downstream connector connection portion may contain a fourth closed space. The flow detector may include a second downstream detector provided in a portion of the second path located on a side of the power storage module relative to the fourth closed space, the second downstream detector detecting the flow state of the gas that flows through the second path.

According to the above configuration, in the second path, the connection state of the downstream connector connection portion where the third connector and the fourth connector are connected to each other on the side of the power storage module relative to the second connection portion can be detected.

The vehicle based on the present disclosure may further include a display unit. A result of detection by the flow detector may be shown on the display unit.

According to the above configuration, a user can know through the display unit, a result of detection by the flow detector.

In the vehicle based on the present disclosure, an inspected power storage device inspected by an inspection device may be attached. The inspected power storage device is a power storage device in which the flow state of the gas that flows through the ventilation path is inspected in advance by the inspection device. The inspection device is provided as being connectable to the refrigerant connector and the electric connector, and the inspection device can supply gas to the ventilation path through at least one of closed spaces formed in respective connection portions while the inspection device is connected to the refrigerant connector and the electric connector.

According to the above configuration, since the power storage device inspected in advance is attached to the vehicle, the connection state between the connector on the vehicle side and the connector on the power storage device side can more reliably be normal.

In the vehicle based on the present disclosure, in attachment of the power storage device, a first mode of replacement of a power storage device inspected by an inspection device and a second mode of replacement of a power storage device not inspected by the inspection device may selectably be provided. The inspected power storage device is a power storage device in which the flow state of the gas that flows through the ventilation path is inspected in advance by the inspection device. The inspection device is provided as being connectable to the refrigerant connector and the electric connector and the inspection device can supply gas to the ventilation path through at least one of closed spaces formed in respective connection portions while the inspection device is connected to the refrigerant connector and the electric connector.

According to the above configuration, a user can make selection between replacement of an inspected power storage device and replacement of an uninspected power storage device by selecting either the first mode or the second mode.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Hereinafter, embodiments of the present disclosure will be described in detail with reference to the drawings. In the following embodiments, the same or common portions are denoted by the same reference numerals, and description thereof will not be repeated.

Figure 1:
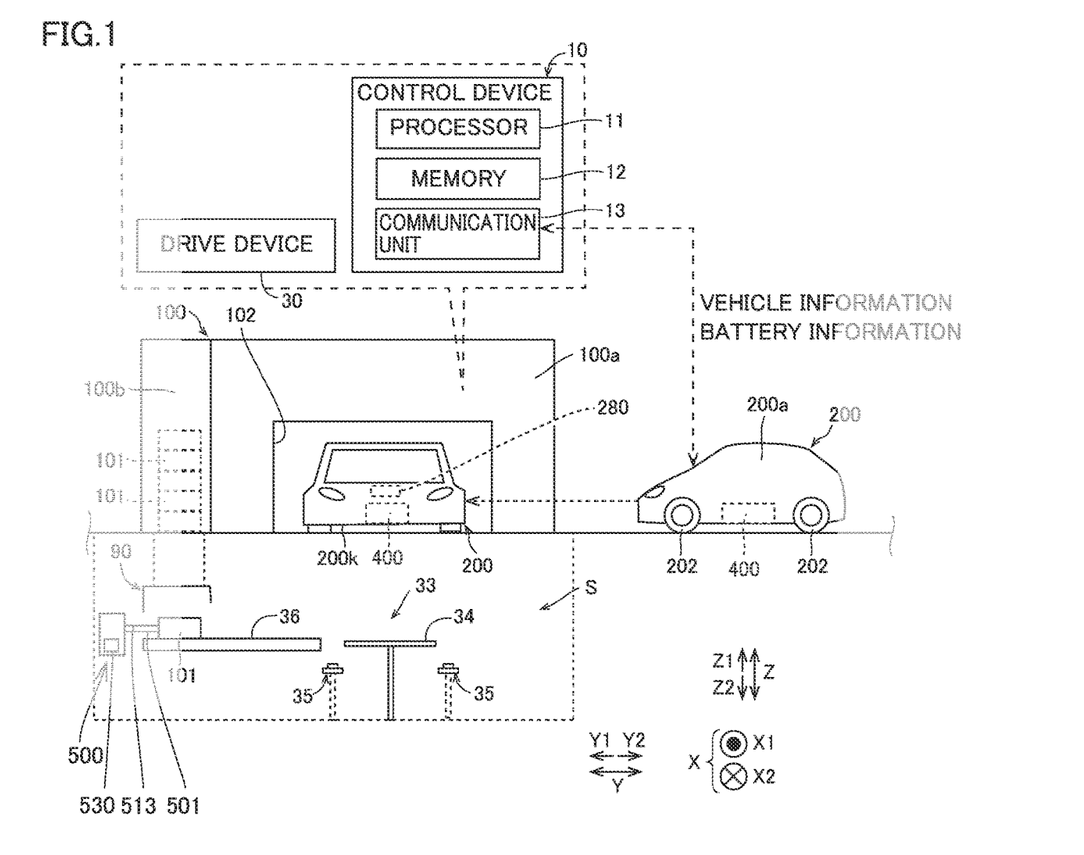
FIG. 1 is a diagram showing a configuration of a battery replacement apparatus according to an embodiment.

FIG. 1 is a diagram showing a configuration of a battery replacement apparatus according to a first embodiment. As shown in FIG. 1, a battery replacement apparatus 100 is an apparatus for replacing a battery (first power storage device) 400 attached to a vehicle 200 with another battery (second power storage device) 101. The other battery 101 may be a new battery or a battery replaced from the vehicle 200 at another timing may be charged again.

The battery replacement apparatus 100 includes a battery replacement station 100a in which battery replacement is performed, and a storage box 100b in which other batteries 101 are stored. The storage box 100b is provided in parallel with the battery replacement station 100a. The battery replacement apparatus 100 has a sub-floor area S.

The battery replacement apparatus 100 includes a battery replacement mechanism 33, a transport unit 36, and an inspection device 500. The battery replacement mechanism 33 is a mechanism for detaching the battery 400 from the vehicle 200 and attaching the other battery 101 to the vehicle 200. The battery replacement mechanism 33 is provided in the storage box 100b and the underfloor area S. The battery replacement mechanism 33 includes a battery mounting table 34 and an elevator 35.

The battery mounting table 34 moves the batteries 400 and 101 between the transport unit 36 and the vehicle 200. The elevator 35 raises and lowers the vehicle 200 between a stop position where the vehicle stops at the battery replacement station 100a and a predetermined height position. The transport unit 36 moves the batteries 101 and 400 between the temporary place 90 and the battery mounting table 34. The transport unit 36 may be of a belt conveyor type, for example.

The transport unit 36 conveys the battery 400, which is detached from the vehicle 200 and mounted on the battery mounting table 34, to the temporary place 90. Specifically, the battery 400 is transferred from the battery mounting table 34 to the transport unit 36 in a state where the battery mounting table 34 on which the removed battery 400 is mounted is lowered to the same height position (position in the Z direction) as the transport unit 36. The transfer of the battery 400 is performed by rotating a roller portion (not shown) of the battery mounting table 34.

Further, the transport unit 36 moves the other batteries 101 transported from the storage box 100b to the temporary place 90 to the Y2 side and places the other batteries 101 on the battery mounting table 34. At this time, the roller portion of the battery mounting table 34 rotates in a direction opposite to the above, whereby the battery 101 is transferred to the Y2 side on the battery mounting table 34.

The transfer of the batteries 101 and 400 between the temporary place 90 and the storage box 100b is performed by another transfer device (not shown).

The inspection device 500 is provided so as to be able to detect a state of a refrigerant connector 413 (see FIG. 2) and an electric connector 401 (see FIG. 2) to be described later of the battery 400 removed from the vehicle 200. Specifically, the inspection device 500 includes an inspection refrigerant connector 513, an inspection electric connector 501, and an inspection gas supply unit 530.

The inspection refrigerant connector 513 is connected to the refrigerant connector 413. The inspection electric connector 501 is connected to the electric connector 401. The inspection gas supply unit 530 is provided so as to be able to supply a gas to a ventilation path 60 (see FIG. 2) described later through at least one of closed spaces formed in each of a connection portion between the inspection refrigerant connector 513 and the refrigerant connector 413 and a connection portion between the inspection electric connector 501 and the electric connector 401.

The inspection device 500 supplies a gas to the ventilation path 60. The ventilation path 60 is provided with a flow detector 50 as described later. The state of the refrigerant connector 413 and the state of the electric connector 401 can be detected by detecting the flow state of the gas flowing through the ventilation path 60 by the flow detector 50. More specifically, it is possible to detect whether or not sealing members 418 and 408 (see FIGS. 3 and 4) to be described later provided in the refrigerant connector 413 and the electric connector 401 are deteriorated. The detection result of the inspection device 500 is stored in a memory 12 described later. In the present embodiment, the inspection device 500 is provided to be able to inspect the battery 400 disposed in the temporary place 90, but the inspection device 500 may be provided to be able to inspect the battery 101 stored in the storage box 100b.

The battery replacement apparatus 100 includes a control device 10 and a drive device 30. The control device 10 includes a processor 11, a memory 12, and a communication unit 13.

The memory 12 stores, in addition to a program executed by the processor 11, information (e.g., map, formula, and various parameters) used by the program. The processor 11 controls the operation of the drive device 30. The drive device 30 includes the battery replacement mechanism 33, the transport unit 36, and the inspection device 500.

The communication unit 13 includes various communication I/Fs. The processor 11 controls the communication unit 13. The communication unit 13 communicates with a DCM or the like of the vehicle 200. The communication unit 13 and the vehicle 200 can perform bidirectional communication. The communication unit 13 may communicate with a mobile terminal or the like possessed by the user of the vehicle 200. The communication unit 13 is an example of a vehicle information acquisition unit that acquires information from a vehicle.

When the battery 400 is replaced, in a state where the vehicle 200 is stopped in the battery replacement station 100a, the user performs an operation of instructing the start of the battery replacement operation in a navigation system (not shown) of the vehicle 200. The communication unit 13 receives an instruction signal for starting a battery replacement operation from the vehicle 200. The processor 11 starts the control of the battery replacement operation based on the reception of the instruction signal by the communication unit 13.

The vehicle 200 may be operated by the user operating the navigation system outside the battery replacement station 100a to automatically stop at a predetermined position inside the battery replacement station 100a. Further, the vehicle may be stopped at a predetermined position by the user driving the vehicle. Note that an operation unit for operating the navigation system is displayed on a display unit 280 of the vehicle.

The vehicle 200 stops in the battery replacement station 100a such that the front-rear direction is the X direction and the left-right direction is the Y direction.

Figure 2:
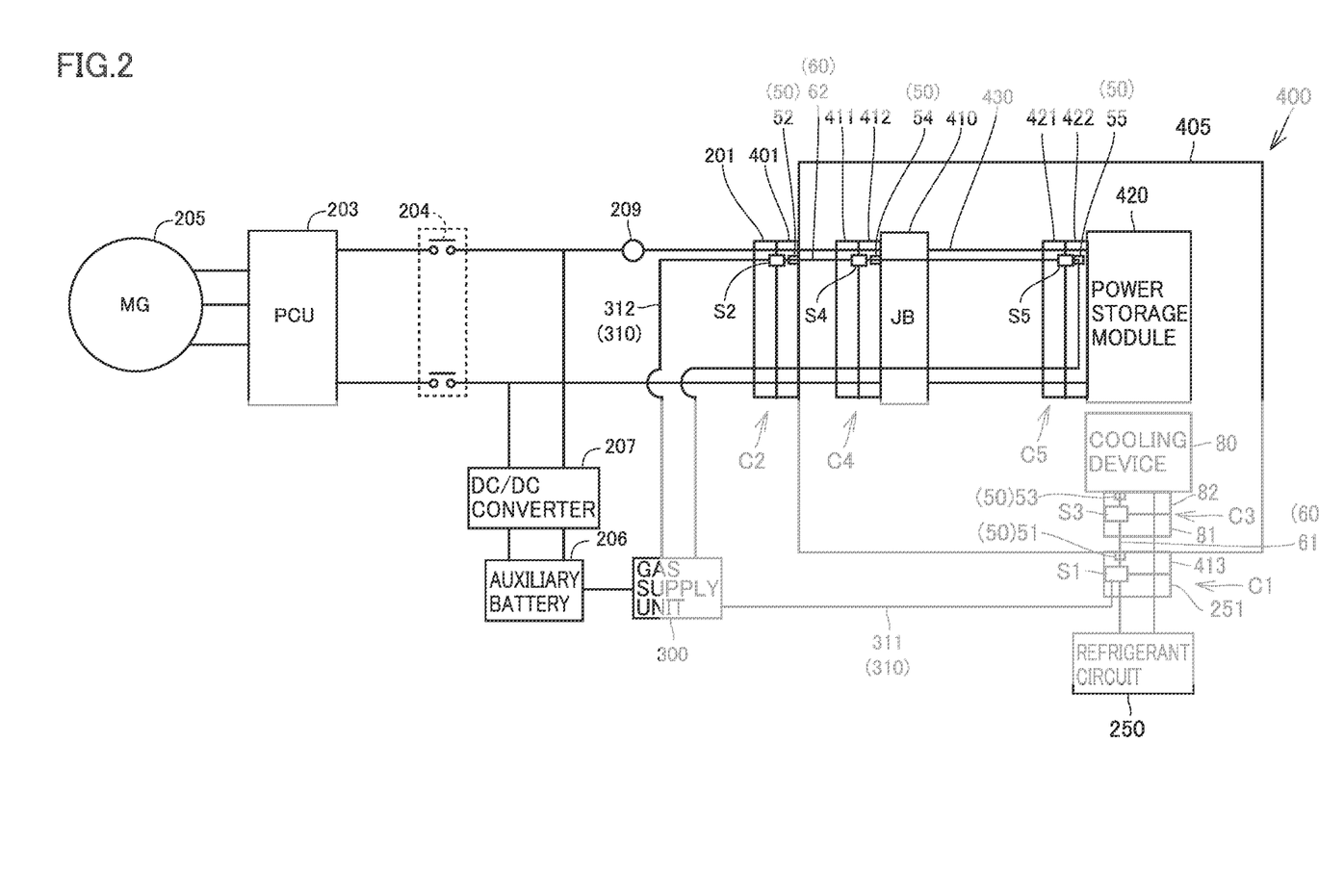
FIG. 2 is a diagram showing a configuration of a vehicle according to the embodiment.

FIG. 2 is a diagram showing a configuration of a vehicle according to the embodiment. A vehicle 200 according to the embodiment will be described with reference to FIG. 2.

As shown in FIG. 2, the vehicle 200 includes a PCU (Power Control Unit) 203, a MG (Motor Generator) 205, an auxiliary battery 206, a DC/DC converter 207, a vehicle side electric connector 201, a vehicle side refrigerant connector 251, a gas supply unit 300, a gas supply pipe 310, a refrigerant circuit 250, and a connection detector 209.

When the battery 400 is replaced, the ignition power supply (not shown) is turned off in a state where the vehicle 200 is stopped in the battery replacement station 100*a*, and the connection between the battery 400 and the PCU 203 is turned off. Thereby, the battery 400 is electrically disconnected from the PCU 203 and the MG 205.

In this state, an operation for instructing the start of the battery replacement operation is performed on the vehicle 200, whereby the battery replacement apparatus 100 starts control of the battery replacement operation. Further, the lock between the vehicle side connector and the connector of the battery 400 is released based on the operation.

After the ignition power supply is turned off, the power of the auxiliary battery 206 is supplied to the accessory such as the MG 205, the DCM, and the gas supply unit 300 via the DC/DC converter 207 and the PCU 203.

The auxiliary battery 206 can supply electric power to the gas supply unit 300 even after the ignition power supply is turned off. The gas supply unit 300 is, for example, a compressor.

The gas supply pipe 310 is connected to the gas supply unit 300. The gas supply pipe 310 is provided so that the gas from the gas supply unit 300 can flow. The gas supply pipe 310 is provided so as to be able to supply a gas to at least one of a first closed space S1 and a second closed space S2 described later. In the present embodiment, the gas supply pipe 310 is provided so as to be able to supply a gas to both the first closed space S1 and the second closed space S2.

The gas supply pipe 310 includes a first supply pipe 311 and a second supply pipe 312. The first supply pipe 311 is provided so as to be able to supply a gas to the first closed space S1. The first supply pipe 311 is provided to connect the gas supply unit 300 and the first closed space S1.

The second supply pipe 312 is provided so as to be able to supply a gas to the second closed space S2. The second supply pipe 312 is provided to connect the gas supply unit 300 and the second closed space S2.

The refrigerant circuit 250 is provided so that the refrigerant flows. As the refrigerant, for example, a liquid such as water can be used. The refrigerant circuit 250 is provided with, for example, a storage tank for storing refrigerant, a pump, and the like. The pump can circulate the refrigerant in the refrigerant circuit 250. The refrigerant circuit 250 is connected to a heat exchanger or the like.

The connection detector 209 detects that the vehicle side electric connector 201 and the battery 400 side electric connector 401 are connected to each other. Specifically, the connection detector 209 detects a current flowing from the auxiliary battery 206 toward the battery 400 by connecting the vehicle side electric connector 201 and the electric connector 401 after the ignition power supply is turned off.

The battery 400 includes a housing case 405, a junction box 410, a power storage module 420, a cooling device 80, an electric connector 401, a first connector 81, a second connector 82, a third connector 411, a fourth connector 412, a fifth connector 421, a sixth connector 422, a flow detector 50, and a ventilation path 60.

The housing case 405 has a substantially box shape. The housing case 405 houses therein the junction box 410, the power storage module 420, and the cooling device 80. An electric connector 401 and a refrigerant connector 413 are provided on an outer surface of the housing case 405 so as to project to the outside.

The power storage module 420 includes a plurality of power storage stacks in which power storage cells are arranged in a predetermined direction.

The power storage cell is, for example, a secondary battery such as a nickel hydride battery or a lithium ion battery. The power storage cell may use either a liquid electrolyte or a solid electrolyte. The power storage cell may be a unit capacitor configured to be capable of storing electric power.

The junction box 410 is disposed between the electric connector 401 and the power storage module 420. The electric connector 401, the junction box 410, and the power storage module 420 are connected by an electric circuit 430. The junction box 410 is provided with, for example, an electronic device for controlling the power storage module 420.

The cooling device 80 is provided so as to be able to cool the power storage module 420. The cooling device 80 is disposed below the power storage module 420, for example. The cooling device 80 is in thermal contact with the power storage module 420. The cooling device 80 is connected to the refrigerant connector 413 through the refrigerant flow path 61. The cooling device 80 is provided so that the refrigerant flows.

The refrigerant connector 413 is connected to the vehicle side refrigerant connector 251. The refrigerant connector 413 is detachably connected to the vehicle side refrigerant connector 251. By connecting the refrigerant connector 413 to the vehicle side refrigerant connector 251, the first connection portion C1 having the first closed space S1 therein is formed.

By connecting the vehicle side refrigerant connector 251 and the refrigerant connector 413, the refrigerant for cooling the power storage module 420 flows through the refrigerant flow path 61. The refrigerant flow path 61 includes a downstream refrigerant connection portion C3 in which the first connector 81 and the second connector 82 are connected to the downstream side of the first connection portion C1 in the flow direction of the refrigerant.

The second connector 82 is provided in the cooling device 80. The first connector 81 is provided at a downstream end of the refrigerant flow path 61 at a portion connecting the refrigerant connector 413 and the second connector 82. The downstream refrigerant connection portion C3 has a third closed space S3 inside.

The electric connector 401 is connected to the vehicle side electric connector 201. The electric connector 401 is detachably connected to the vehicle side electric connector 201. By connecting the electric connector 401 to the vehicle side electric connector 201, the second connection portion C2 having the second closed space S2 is formed.

The junction box 410 is provided with a fourth connector 412. The electric circuit 430 includes a plurality of electric wires. The electric circuit 430 includes electrical wires connecting the electric connector 401 and the junction box 410. An electric connector 401 is provided at one end of the electrical wiring, and a third connector 411 is provided at the other end of the electrical wiring.

The electric circuit 430 includes a first downstream connector connection portion C4 in which the third connector 411 and the fourth connector 412 are connected. The first downstream connector connection portion C4 has a fourth closed space S4 inside.

The power storage module 420 is provided with a sixth connector 422. The electric circuit 430 includes an electric wiring that connects the junction box 410 and the power storage module 420. One end of the electrical wiring is connected to the junction box 410. A fifth connector 421 is provided at the other end of the electrical wiring.

The electric circuit 430 includes a second downstream connector connection portion C5 in which the fifth connector 421 and the sixth connector 422 are connected. The second downstream connector connecting portion C5 has a fifth closed space S5 inside.

The ventilation path 60 is provided so as to be able to communicate with the gas supply pipe 310. The ventilation path 60 is provided so as to be able to communicate with the gas supply pipe 310 via at least one closed space of the first closed space S1 and the second closed space S2. Specifically, the ventilation path 60 includes a first path communicating with the first closed space S1 and a second path 62 communicating with the second closed space S2.

The first path is formed by a refrigerant flow path 61. The first path is provided so as to pass through the third closed space S3. The second path 62 is provided along the electric circuit 430. The second path 62 is provided so as to pass through the fourth closed space S4 and the fifth closed space S5.

The flow detector 50 is provided in the ventilation path 60, and detects the flow state of the gas flowing through the ventilation path 60. The flow detector 50 is provided, for example, so as to be able to detect the pressure of the gas. As the flow detector 50, for example, a check valve can be adopted.

The flow detector 50 includes a first detector 51, a second detector 52, a first downstream detector 53, a second downstream detector 54, and a third downstream detector 55.

The first detector 51 is provided in the first path (the refrigerant flow path 61). More specifically, the first detector 51 is provided on the downstream side of the first closed space S1 and on the upstream side of the third closed space S3 in the refrigerant flow path 61. The first detector 51 detects the flow state of the gas flowing in the first path on the downstream side of the first closed space S1 and on the upstream side of the third closed space S3.

By detecting the flow state of the gas by the first detector 51, it is possible to confirm whether or not the connection state between the vehicle side refrigerant connector 251 and the refrigerant connector 413 is normal.

The first downstream detector 53 is provided in the first path. More specifically, the first downstream detector 53 is provided on the downstream side of the third closed space S3 in the refrigerant flow path 61. The first downstream detector 53 detects the flow state of the gas flowing in the first path on the downstream side of the third closed space S3.

By detecting the flow state of the gas by the first downstream detector 53, it is possible to confirm whether or not the connection state between the first connector 81 and the second connector 82 is normal.

The second detector 52 is provided in the second path 62. More specifically, the second detector 52 is disposed on the downstream side of the second closed space S2 and on the upstream side of the fourth closed space S4 in the second path 62. The second detector 52 detects the flow state of the gas flowing through the second path 62 on the downstream side of the second closed space S2 and on the upstream side of the fourth closed space S4.

By detecting the flow state of the gas by the second detector 52, it is possible to confirm whether or not the connection state between the vehicle side electric connector 201 and the electric connector 401 is normal.

The second downstream detector 54 is provided in the second path 62. More specifically, the second downstream detector 54 is provided on the downstream side of the fourth closed space S4 and on the upstream side of the fifth closed space S5 in the second path 62. The second downstream detector 54 detects the flow state of the gas flowing through the second path 62 on the downstream side of the fourth closed space S4 and on the upstream side of the fifth closed space S5.

By detecting the flow state of the gas by the second downstream detector 54, it is possible to confirm whether or not the connection state between the third connector 411 and the fourth connector 412 is normal.

The third downstream detector 55 is provided in the second path 62. More specifically, the third downstream detector 55 is provided on the downstream side of the fifth closed space S5 in the second path 62. The second downstream detector 54 detects the flow state of the gas flowing through the second path 62 on the downstream side of the fifth closed space S5.

By detecting the flow state of the gas by the third downstream detector 55, it is possible to confirm whether or not the connection state between the fifth connector 421 and the sixth connector 422 is normal.

The detection results of the first detector 51, the second detector 52, the first downstream detector 53, the second downstream detector 54, and the third downstream detector 55 are displayed on the display unit 280. When it is determined that the connection state of each connector is abnormal, the detection result of the detector determined to be abnormal may be displayed on the display unit 280.

Figure 3:
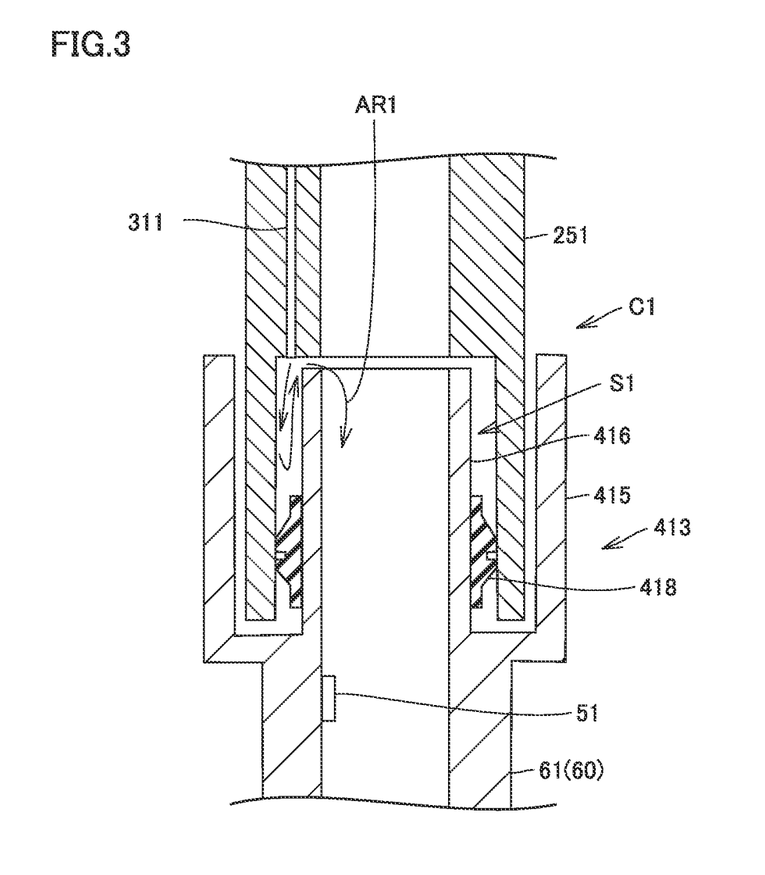
FIG. 3 is a schematic cross-sectional view showing a first connection portion in which a vehicle side refrigerant connector and a battery side refrigerant connector according to the embodiment are connected.

FIG. 3 is a schematic cross-sectional view showing a first connection portion in which a vehicle side refrigerant connector and a battery side refrigerant connector according to the embodiment are connected. The details of the first connection portion C1 will be described with reference to FIG. 3. Since the configuration of the downstream refrigerant connection portion C3 in which the first connector 81 and the second connector 82 are connected is substantially the same as the configuration of the first connection portion C1, the description thereof will be omitted.

As shown in FIG. 3, the vehicle side refrigerant connector 251 has a cylindrical shape. The first supply pipe 311 is provided so as to enter the interior of the vehicle side refrigerant connector 251.

The refrigerant connector 413 includes an outer cylindrical portion 415, an inner cylindrical portion 416, and a sealing member 418. The outer cylindrical portion 415 is provided so as to surround the inner cylindrical portion 416. The sealing member 418 is disposed between the inner cylindrical portion 416 and the outer cylindrical portion 415. The sealing member 418 is fixed to the outer peripheral surface of the inner cylindrical portion 416 in a state in which the sealing member 418 is in close contact with the outer peripheral surface of the inner cylindrical portion 416.

When the vehicle side refrigerant connector 251 and the refrigerant connector 413 are connected to each other, the distal end of the vehicle side refrigerant connector 251 enters between the outer cylindrical portion 415 and the inner cylindrical portion 416. At this time, the inner peripheral surface of the tip is in close contact with the sealing member 418, and a first closed space S1 is formed in a portion surrounded by the inner peripheral surface of the tip, the outer peripheral surface of the inner cylindrical portion 416, and the sealing member 418.

When a gas is introduced from the first supply pipe 311 into the first closed space S1 and the sealing member 418 is not deteriorated, the gas passes through the interior of the refrigerant connector 413 (more specifically, the inner cylindrical portion 416) as indicated by an arrow AR1.

On the other hand, when the sealing member 418 is deteriorated, the gas is discharged to the outside through the gap between the outer cylindrical portion 415 and the tip of the vehicle side refrigerant connector 251.

Therefore, the connection state between the vehicle side refrigerant connector 251 and the refrigerant connector 413 can be detected by detecting the state (for example, pressure) of the gas flowing through the refrigerant flow path 61 by the first detector 51.

Figure 4:
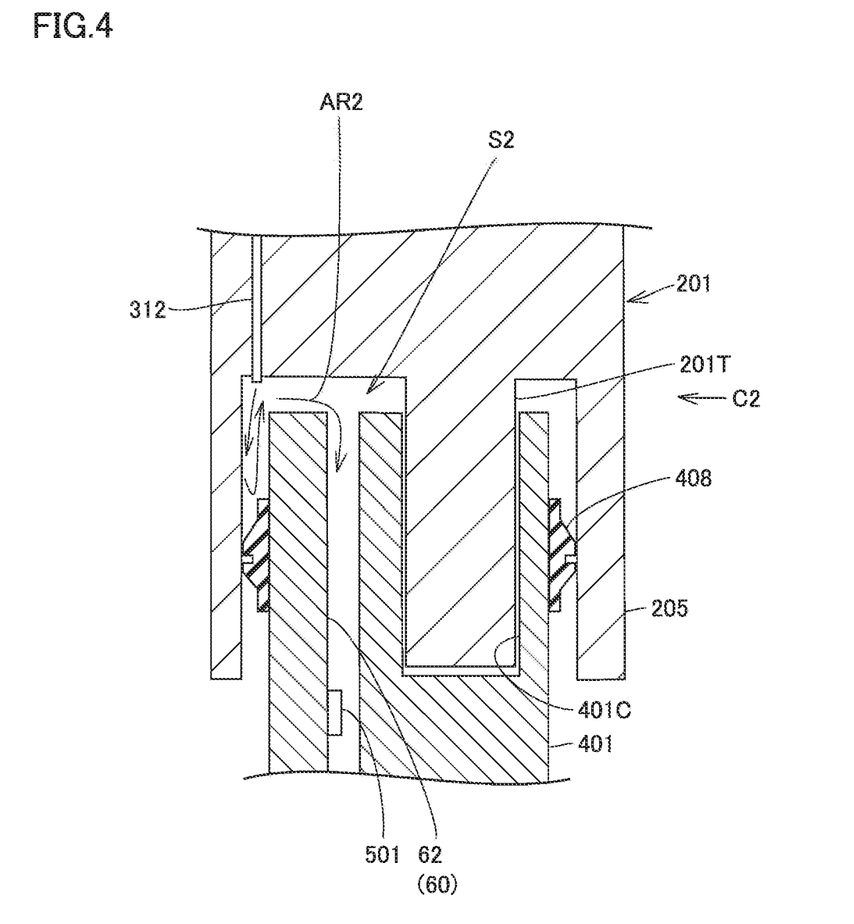
FIG. 4 is a schematic cross-sectional view showing a second connection portion in which a vehicle side electric connector and a battery side electric connector according to the embodiment are connected.

FIG. 4 is a schematic cross-sectional view showing a second connection portion in which a vehicle side electric connector and a battery side electric connector according to the embodiment are connected. The details of the second connection portion C2 will be described with reference to FIG. 4. The configuration of the first downstream connector connection portion C4 in which the third connector 411 and the fourth connector 412 are connected and the configuration of the second downstream connector connection portion C5 in which the fifth connector 421 and the sixth connector 422 are connected are substantially the same as those of the second connection portion C2, and thus the description thereof is omitted.

As shown in FIG. 4, the vehicle side electric connector 201 includes a cylindrical portion 205 provided at a distal end thereof and a terminal portion 201T provided inside the cylindrical portion 205. The second supply pipe 312 is provided to enter the interior of the vehicle side electric connector 201.

The electric connector 401 includes a terminal insertion portion 401C into which the terminal portion 201T is inserted, and a sealing member 408. The sealing member 408 is fixed to the outer peripheral surface of the electric connector 401 in a state of being in close contact with the outer peripheral surface of the electric connector 401. The electric connector 401 is provided with a part of the second path 62.

When the vehicle side electric connector 201 and the electric connector 401 are connected, the terminal portion 201T is inserted into the terminal insertion portion 401C. At this time, the inner peripheral surface of the cylindrical portion 205 is in close contact with the sealing member 408, and the second closed space S2 is formed in a portion surrounded by the inner peripheral surface of the cylindrical portion 205, the outer peripheral surface positioned at the distal end side of the electric connector 401, and the sealing member 408.

When a gas is introduced into the second closed space S2 from the second supply pipe 312 and the sealing member 408 is not deteriorated, the gas passes through the inside of the second path 62 as indicated by an arrow AR2.

On the other hand, when the sealing member 408 deteriorates, the gas is discharged to the outside through the gap between the cylindrical portion 205 and the distal end side of the electric connector 401.

Therefore, the state of the connection between the vehicle side electric connector 201 and the electric connector 401 can be detected by detecting the state of the gas flowing through the second path 62 by the second detector 52.

Figure 5:
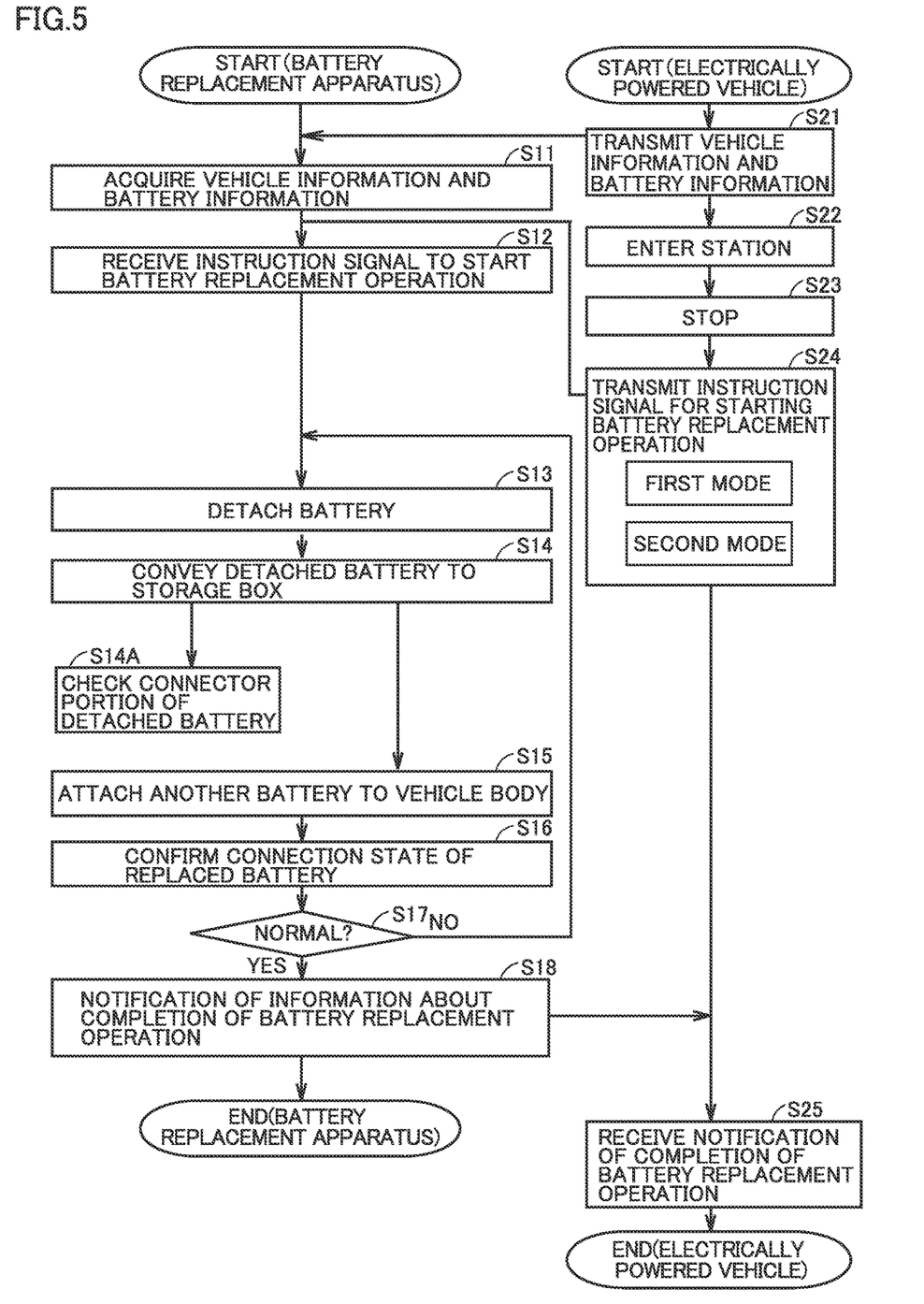
FIG. 5 is a flowchart showing a battery replacement step of the battery replacement apparatus according to the embodiment.

FIG. 5 is a flowchart showing a battery replacement step of the battery replacement apparatus according to the embodiment. Referring to FIG. 5, the flow of battery replacement according to the embodiment will be described.

[Transmission of Vehicle Information and the Like:]

First, in step S21, the vehicle 200 transmits information about the vehicle 200 and information about the battery 400 to the communication unit 13 of the battery replacement apparatus 100. For example, when an operation of transmitting the above information is performed in a navigation system (not shown) of the vehicle 200, the above information is transmitted to the communication unit 13. The vehicle 200 transmits the above information before entering the battery replacement apparatus 100. The above information may be transmitted after the vehicle 200 enters the battery replacement apparatus 100.

[Acquisition of Vehicle Information and the Like: Battery Replacement Apparatus]

Next, in step S11, the communication unit 13 of the battery replacement apparatus 100 acquires information about the vehicle 200 and information about the battery 400 transmitted from the vehicle 200 in step S21 by communication. The acquired information is stored in the memory 12 (see FIG. 1).

[Entry of the Vehicle into the Battery Replacement Station:]

When the vehicle information and the battery information are transmitted from the vehicle 200 to the communication unit 13 in step S21, the vehicle 200 enters the battery replacement station 100a by automated driving or driving by a user in step S22.

[Vehicle Stop in the Vehicle Stop Region:]

Subsequently, in step S23, the vehicle 200 stops at a predetermined position in the battery replacement station 100a.

[Transmission of an Instruction Signal for a Battery Replacement Operation:]

Next, in step S24, the vehicle 200 stopped in the battery replacement station 100a transmits an instruction signal for starting the battery replacement operation to the communication unit 13. After transmitting the instruction signal to the communication unit 13, the vehicle 200 turns off the SMR (System Main Relay). At this time, communication between the vehicle 200 and the communication unit 13 is maintained by power supply from the auxiliary battery 206 (see FIG. 2).

When the instruction signal for starting the battery replacement operation is transmitted to the communication unit 13, the user may select the first mode or the second mode.

When the first mode is selected, it is possible to replace the inspected battery 101 and the battery 400 in which the flow state of the gas flowing in the ventilation path 60 is previously detected by the inspection device 500. That is, in the replacement operation, there is no abnormality in the sealing members 408 and 418, and the battery 101 that can be normally connected to the vehicle 200 can be replaced. In this case, step S16 described later may be omitted.

When the second mode is selected, the battery 101 and the battery 400 which are not inspected by the inspection device 500 can be replaced. In this case, in step S16, it is confirmed whether or not the connection between the replaced battery 101 and the vehicle 200 is normal.

When the first mode is selected, the replacement fee may be set higher than when the second mode is selected.

[Receiving an Instruction Signal for a Battery Replacement Operation:]

Next, in step S12, the communication unit 13 receives the instruction signal transmitted from the vehicle 200 in step S24. In step S12, after receiving the instruction signal, the processor 11 may transmit an instruction message or the like for turning off the ignition power supply to the user of the vehicle 200 through the communication unit 13.

[Removal of Battery: Battery Replacement Apparatus]

Next, in step S13, the battery 400 is detached from the vehicle body 200a of the vehicle 200.

Specifically, the elevator 35 lifts the vehicle 200 to a predetermined height position, and moves the battery mounting table 34 below the battery 400. Subsequently, the locking of the battery 400 to the vehicle is released by the locking tool provided on the battery mounting table 34. Thus, the battery 400 is detached from the vehicle. At this time, the connection between the vehicle side refrigerant connector 251 and the refrigerant connector 413 and the connection between the vehicle side electric connector 201 and the electric connector 401 are also released.

[Transport Battery to Storage: Battery Replacement Apparatus]

Next, in step S14, the battery 400 removed from the vehicle body 200a is conveyed to the storage box 100b. Specifically, the battery mounting table 34 on which the battery 400 is mounted is lowered to the height position of the transport unit 36.

Subsequently, the battery 400 mounted on the battery mounting table 34 is transferred to the transport unit 36. The battery 400 transferred to the transport unit 36 is transferred to the temporary place 90. The battery 400 is stored in the storage box 100b by another transfer device (not shown).

[Checking the Connector of the Removed Battery: Battery Replacement Apparatus]

Next, in step S14A, the states of the connector portions (the electric connector 401 and the refrigerant connector 413) of the removed battery 400 are checked.

Specifically, the inspection device 500 and the battery 400 are connected to each other, and a gas is supplied to the ventilation path 60. At this time, the flow state of the gas flowing through the ventilation path 60 is detected by the flow detector 50. Thereby, it is possible to confirm whether or not the sealing members 408 and 418 provided in the battery 400 are deteriorated.

When the inspection device 500 is connected to the battery 400, the inspection refrigerant connector 513 and the inspection electric connector 501 are connected to the refrigerant connector 413 and the electric connector 401.

Step S14A may be performed when the removed battery 400 is conveyed to the temporary place or may be performed after being conveyed to the storage box 100b.

[Other Battery Mounting: Battery Replacement Apparatus]

Next, in step S15, another battery 101 is attached to the vehicle body 200a. Specifically, by raising the elevator 35, the vehicle 200 is held parallel to the horizontal direction at a predetermined height position.

Subsequently, the battery mounting table 34 on which the battery 101 is mounted is raised, and the battery 101 is locked to the vehicle body 200a using a locking tool. At this time, the vehicle side electric connector 201 and the electric connector 401, and the vehicle side refrigerant connector 251 and the refrigerant connector 413 are connected to each other.

[Confirmation of the Connected State of the Replaced Battery: Battery Replacement Apparatus]

Next, in step S16, the connection state of the replaced battery 101 is confirmed. Specifically, in a state where the vehicle side electric connector 201 and the electric connector 401 and the vehicle side refrigerant connector 251 and the refrigerant connector 413 are connected to each other, the gas supply unit 300 is driven to introduce the gas into the ventilation path 60.

As described above, the flow state of the gas flowing through the ventilation path 60 is detected by the flow detector 50 to confirm the connection state between the vehicle 200 and the battery 101.

At this time, when it is confirmed that the connection state between the vehicle 200 and the battery 101 is normal (step S17; YES), step S18 is performed. When it is confirmed that the connection state between the vehicle 200 and the battery 101 is abnormal (step S17; NO), the operation from step S13 is repeated. When it is confirmed that the connection state is abnormal, a lamp for notifying an abnormality may be turned on or a mark for notifying an abnormality may be displayed on the display unit 280.

When the first mode is selected in step S24 as described above, step S16 may be omitted.

[Notification of Completion of Battery Replacement Work: Battery Replacement Apparatus]

Next, in step S18, the processor 11 notifies the vehicle 200 of the completion of the battery replacement operation through the communication unit 13.

[Receipt of the Battery Replacement Work Completion Notification: Vehicle]

In step S25, the vehicle 200 receives the notification transmitted from the communication unit 13 of the battery replacement apparatus 100 in step S18. Thus, the vehicle 200 is brought into a state in which the ignition power supply can be turned on. Thereafter, the process ends.

Through the above steps, the battery replacement apparatus 100 can replace the battery 400 with a new battery 101.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle to which a power storage device is attached replaceably, the vehicle comprising:
   the power storage device;
   an auxiliary battery;
   a gas supply unit to which power is supplied from the auxiliary battery;
   a refrigerant circuit through which refrigerant flows, the refrigerant circuit including a vehicle side refrigerant connector provided as being connectable to the power storage device;
   a vehicle side electric connector provided as being connectable to the power storage device; and
   a gas supply pipe to which gas can flow from the gas supply unit, the gas supply pipe being connected to the gas supply unit, wherein
   the power storage device includes
      an electric connector provided as being connectable to the vehicle side electric connector,
      a refrigerant connector provided as being connectable to the vehicle side refrigerant connector, and
      a ventilation path provided to communicate to the gas supply pipe,
   the vehicle side refrigerant connector and the refrigerant connector are connected to form a first connection portion that contains a first closed space,
   the vehicle side electric connector and the electric connector are connected to form a second connection portion that contains a second closed space,
   the gas supply pipe is provided to supply the gas into at least one closed space of the first closed space and the second closed space,
   the ventilation path is provided to communicate with the gas supply pipe through the at least one closed space, and the ventilation path is provided with a flow detector that detects a flow state of the gas that flows through the ventilation path.

2. The vehicle according to claim 1, further comprising:
a controller that controls an operation of the gas supply unit with power from the auxiliary battery; and
a connection detector that detects connection of the vehicle side electric connector and the electric connector to each other, wherein
the power storage device includes a power storage module and a refrigerant flow path through which the refrigerant for cooling of the power storage module flows,
the gas supply pipe includes a first supply pipe through which the gas can be supplied to the first closed space,
the ventilation path includes a first path formed by the refrigerant flow path,
when the connection detector detects connection of the electric connector and the vehicle side electric connector to each other, the controller drives the gas supply unit to introduce the gas into the first closed space, and
the flow detector includes a first detector that detects a flow state of the gas that flows through the first path.

3. The vehicle according to claim 2, wherein
the first path includes a downstream refrigerant connection portion in which a first connector and a second connector are connected to each other, on a downstream side of the first connection portion in a flow direction of the refrigerant,
the downstream refrigerant connection portion contains a third closed space, and
the flow detector includes a first downstream detector provided in a portion of the first path located downstream of the third closed space, the first downstream detector detecting the flow state of the gas that flows through the first path.

4. The vehicle according to claim 1, further comprising:
a controller that controls an operation of the gas supply unit with power from the auxiliary battery; and
a connection detector that detects connection of the vehicle side electric connector and the electric connector to each other, wherein
the power storage device includes a power storage module and an electric circuit that connects the power storage module and the electric connector to each other,
the gas supply pipe includes a second supply pipe through which the gas can be supplied to the second closed space,
the ventilation path includes a second path provided along the electric circuit,
when the connection detector detects connection of the electric connector and the vehicle side electric connector to each other, the controller drives the gas supply unit to introduce the gas into the second closed space, and
the flow detector includes a second detector that detects a flow state of the gas that flows through the second path.

5. The vehicle according to claim 4, wherein
the electric circuit includes a downstream connector connection portion where a third connector and a fourth connector are connected to each other, on a side of the power storage module relative to the second connection portion,
the downstream connector connection portion contains a fourth closed space,
the second path is provided to pass through the fourth closed space, and
the flow detector includes a second downstream detector provided in a portion of the second path located on a side of the power storage module relative to the fourth closed space, the second downstream detector detecting the flow state of the gas that flows through the second path.

6. The vehicle according to claim 1, further comprising a display unit, wherein
a result of detection by the flow detector is shown on the display unit.

7. The vehicle according to claim 1, wherein
an inspected power storage device inspected by an inspection device is attached,
the inspected power storage device is a power storage device in which the flow state of the gas that flows through the ventilation path is inspected in advance by the inspection device, and
the inspection device is provided as being connectable to the refrigerant connector and the electric connector, and the inspection device can supply gas to the ventilation path through at least one of closed spaces formed in respective connection portions while the inspection device is connected to the refrigerant connector and the electric connector.

8. The vehicle according to claim 1, wherein
in attachment of the power storage device, a first mode of replacement of a power storage device inspected by an inspection device and a second mode of replacement of a power storage device not inspected by the inspection device are selectably provided,
the inspected power storage device is a power storage device in which the flow state of the gas that flows through the ventilation path is inspected in advance by the inspection device,
the inspection device is provided as being connectable to the refrigerant connector and the electric connector and the inspection device can supply gas to the ventilation path through at least one of closed spaces formed in respective connection portions while the inspection device is connected to the refrigerant connector and the electric connector.

* * * * *